US012748521B2

(12) United States Patent
Qiu

(10) Patent No.: US 12,748,521 B2
(45) Date of Patent: Sep. 29, 2026

(54) IMAGE PROCESSING METHOD, ELECTRONIC DEVICE, AND NON-TRANSITORY READABLE STORAGE MEDIUM

(71) Applicant: VIVO MOBILE COMMUNICATION CO., LTD., Dongguan (CN)

(72) Inventor: Changxin Qiu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 198 days.

(21) Appl. No.: 18/753,347

(22) Filed: Jun. 25, 2024

(65) Prior Publication Data

US 2024/0346726 A1 Oct. 17, 2024

Related U.S. Application Data

(63) Continuation of application No. PCT/CN2022/140408, filed on Dec. 20, 2022.

(30) Foreign Application Priority Data

Dec. 29, 2021 (CN) ......................... 202111639868.2

(51) Int. Cl.

| | |
|---|---|
| ***G06F 3/0481*** | (2022.01) |
| ***G06T 7/90*** | (2017.01) |
| ***G06T 11/60*** | (2006.01) |
| ***G06V 10/56*** | (2022.01) |
| ***G06V 10/60*** | (2022.01) |
| ***H04N 9/73*** | (2023.01) |

(52) U.S. Cl.

CPC .............. *G06F 3/0481* (2013.01); *G06T 7/90* (2017.01); *G06T 11/60* (2013.01); *G06V 10/56* (2022.01); *G06V 10/60* (2022.01); *H04N 9/73* (2013.01); *G06T 2207/10024* (2013.01)

(58) Field of Classification Search

CPC . G06T 11/60; G06T 7/90; G06T 2207/10024; G06V 10/56; G06V 10/60; H04N 9/73

USPC .......................................................... 345/619

See application file for complete search history.

(56) References Cited

U.S. PATENT DOCUMENTS

| | | | | |
|---|---|---|---|---|
| 2006/0028483 | A1 | 2/2006 | Kondo et al. | |
| 2006/0053374 | A1 * | 3/2006 | Wilensky ................ | H04N 5/14 348/E9.037 |
| 2012/0019550 | A1 * | 1/2012 | Pettigrew ............... | G06T 11/60 345/593 |
| 2013/0235069 | A1 | 9/2013 | Ubillos et al. | |
| 2021/0209815 | A1 * | 7/2021 | Ekstrand ................ | G06F 9/451 |

FOREIGN PATENT DOCUMENTS

| | | | | |
|---|---|---|---|---|
| CN | 109427036 | * | 8/2017 | ............... G06T 3/00 |
| CN | 109191403 | A | 1/2019 | |
| CN | 109447958 | A | 3/2019 | |
| CN | 111885298 | A | 11/2020 | |

(Continued)

*Primary Examiner* — Jin Ge

(74) *Attorney, Agent, or Firm* — The Webb Law Firm

(57) ABSTRACT

An image processing method includes displaying a first image and a target control; receiving a first input to the target control by a user. In response to the first input, adjusting the first image to a target effect corresponding to the first input; where the target control is used for adjusting color or light shadow.

9 Claims, 5 Drawing Sheets

(56) References Cited

FOREIGN PATENT DOCUMENTS

| | | | |
|---|---|---|---|
| CN | 112269522 | A | 1/2021 |
| CN | 114327166 | A | 4/2022 |
| EP | 2114065 | A2 | 11/2009 |

* cited by examiner

IMAGE PROCESSING METHOD, ELECTRONIC DEVICE, AND NON-TRANSITORY READABLE STORAGE MEDIUM

CROSS-REFERENCE TO RELATED APPLICATIONS

This application is a Bypass Continuation Application of International Patent Application No. PCT/CN2022/140408, filed Dec. 20, 2022, and claims priority to Chinese Patent Application No. 202111639868.2, filed Dec. 29, 2021, the disclosures of which are hereby incorporated by reference in their entireties.

BACKGROUND OF THE INVENTION

Field of the Invention

This application pertains to the field of image processing technologies, and in particular, relates to an image processing method, an electronic device, and a non-transitory readable storage medium.

Description of Related Art

With continuous enrichment of a shooting function of electronic devices, increasing people choose to shoot images using an electronic device. However, due to shooting scenes, shooting techniques, and other reasons, some images shot have relatively poor effects. Therefore, when needing to use these images, users need to perform processing on the images to obtain images with distinct layers and prominent subjects.

SUMMARY OF THE INVENTION

According to a first aspect, an embodiment of this application provides an image processing method. The method includes: displaying a first image and a target control; receiving a first input to the target control by a user; and in response to the first input, adjusting the first image to a target effect corresponding to the first input; where the target control is used for adjusting color or light shadow.

According to a second aspect, an embodiment of this application provides an image processing apparatus. The apparatus includes: a display module, a receiving module, and an adjusting module. The display module is configured to display a first image and a target control; the receiving module is configured to receive a first input to the target control by a user; and the adjusting module is configured to, in response to the first input received by the receiving module, adjust the first image to a target effect corresponding to the first input; where the target control is used for adjusting color or light shadow.

According to a third aspect, an embodiment of this application provides an electronic device, where the electronic device includes a processor, a memory, and a program or instructions stored in the memory and executable on the processor, and when the program or the instructions are executed by the processor, steps of the method according to the first aspect are implemented.

According to a fourth aspect, an embodiment of this application provides a non-transitory readable storage medium, where a program or instructions are stored in the non-transitory readable storage medium, and when the program or the instructions are executed by a processor, steps of the method according to the first aspect are implemented.

According to a fifth aspect, an embodiment of this application provides a chip, where the chip includes a processor and a communication interface, the communication interface is coupled to the processor, and the processor is configured to run a program or instructions to implement the method according to the first aspect.

According to a sixth aspect, an embodiment of this application provides a computer program product, where the program product is stored in a non-transitory storage medium, and the program product is executed by at least one processor to implement the method according to the first aspect.

DESCRIPTION OF THE INVENTION

Figure 1:
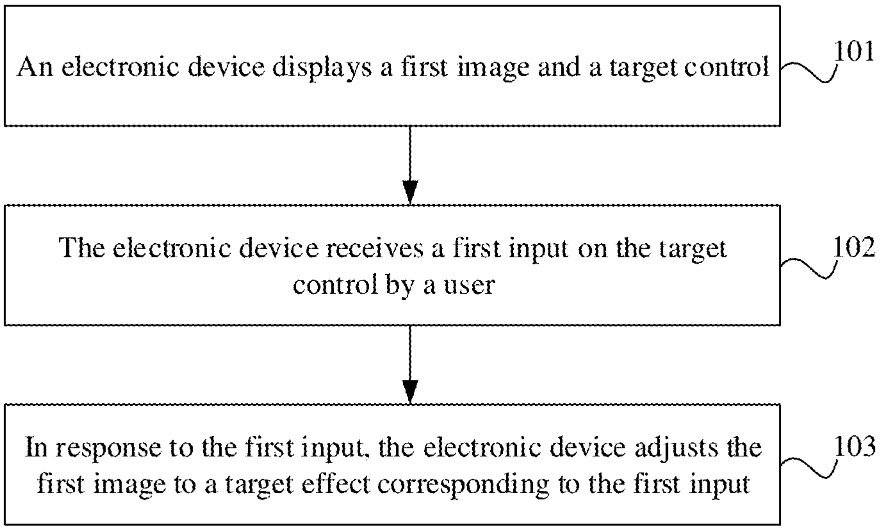
FIG. 1 is a flowchart of an image processing method according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate an order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, "and/or" in this specification and claims indicates at least one of connected objects, and the symbol "/" generally indicates that the associated objects are in an "or" relationship.

The following describes in detail an image processing method provided in the embodiments of this application by using embodiments and application scenarios thereof with reference to the accompanying drawings.

The popularity of electronic devices makes shooting popular, and everyone can record things around. The popularity of social media makes everyone more willing to show their lives through images and videos. However, due to shooting scenes and other reasons, some images in electronic devices of users are common and unattractive, requiring processing on the images. At present, the user can use an image editing function or professional retouching software in the electronic device to make input on multiple parameter controls on an image editing screen, so as to trigger the electronic device to adjust multiple parameters of an image, implementing image processing to obtain an image that satisfy users. However, according to the foregoing method, the user does not fully understand image parameters, and the user needs multiple inputs to trigger the electronic device to adjust the multiple parameters of the image; therefore, the image processing process may be relatively complicated. Most users do not know about retouching knowledge, and it is difficult to understand complex image parameters. Moreover, professional retouching is extremely complex, still with a very high threshold. The user may need to adjust multiple image parameters repeatedly to obtain an image that is powerful enough, with distinct layers and prominent subjects. The users know what a good image should look like; however, in face of complicated processing, the users often choose to give up image processing.

To resolve the foregoing problems, the embodiments of this application provide an image processing method, which can provide users with processing functions with accurate recognition of main and auxiliary color, controllable adjustment effects, and wonderful processed images based on the underlying functions such as color recognition and channel search, thus lowering a threshold for users to process images and simplifying the image processing process.

The image processing method provided in the embodiments of this application can be applied to scenes of image processing.

For example, assuming that an electronic device displays an image 1 (for example, a first image in this embodiment of this application) and a control a for adjusting color or light shadow (for example, a target control in this embodiment of this application), if the electronic device receives an input on the control a (for example, a first input in this embodiment of this application) by a user, the electronic device can adjust the image 1 to an effect corresponding to the input (for example, a target effect in this embodiment of this application). That is, when the electronic device processes the image 1, a color or light shadow effect of the image 1 can be adjusted through only one input of the user, thereby simplifying the image processing process.

An embodiment of this application provides an image processing method, and FIG. 1 is a flowchart of an image processing method according to an embodiment of this application.

As shown in FIG. 1, the image processing method provided in this embodiment of this application may include the following steps 101 to 103.

Step 101: An electronic device displays a first image and a target control.

Optionally, in this embodiment of this application, the electronic device can display the first image and the target control on any possible screen such as a shooting preview screen, a shooting screen, or an image browsing screen.

Optionally, in this embodiment of this application, the shooting preview screen may be a screen for displaying a shooting preview image in a camera application, and the electronic device can display the shooting preview screen after the user triggers and selects the camera application.

Optionally, in this embodiment of this application, the shooting screen may be a screen for displaying a shooting image in the camera application, and the electronic device can display the shooting screen after the user triggers the camera application to shoot.

Optionally, in this embodiment of this application, the image browsing screen may be a screen for displaying an image in an album application, and the electronic device can display the image browsing screen after the user triggers and selects an image in the album application.

Optionally, in this embodiment of this application, the first image may be any one image stored in the electronic device, or may be an image obtained in real time by the electronic device in the shooting preview screen.

Optionally, in this embodiment of this application, the target control may be provided in any region in the foregoing screen, and may be a control with any possible shape, which may be determined according to actual use requirements. This is not limited in this embodiment of this application.

Step 102: The electronic device receives a first input to the target control by a user.

Optionally, in this embodiment of this application, the first input may be any possible input such as a floating input or a touch input, which may be determined according to actual use requirements. This is not limited in this embodiment of this application.

For example, using the first input being a touch input on the target control by the user as an example, the first input may be any possible touch input, such as a tap input, a touch-and-hold input, or a hard-press input, on the target control by the user.

Step 103: In response to the first input, the electronic device adjusts the first image to a target effect corresponding to the first input.

Optionally, in this embodiment of this application, the target control may be used for adjusting color or light shadow.

Optionally, in this embodiment of this application, each position of the target control may correspond to a different color parameter or a light and shadow parameter, and the electronic device can adjust the color parameter or light and shadow parameter of the first image based on an end position of the first input, so as to adjust the first image to the target effect corresponding to the first input.

Optionally, in this embodiment of this application, the color parameter may include saturation, or saturation and brightness, and any one of the following: contrast and dark angle; contrast and natural saturation; and contrast, natural saturation, and color temperature.

Optionally, in this embodiment of this application, the light and shadow parameter may include an exposure parameter, a highlight parameter, and a shadow parameter.

The method for adjusting the first image to the target effect corresponding to the first input by the electronic device is described in detail in the following embodiments. To avoid repetition, details are not described here.

The following describes the image processing method provided in this embodiment of this application by using examples with reference to the accompanying drawings.

Figure 2:
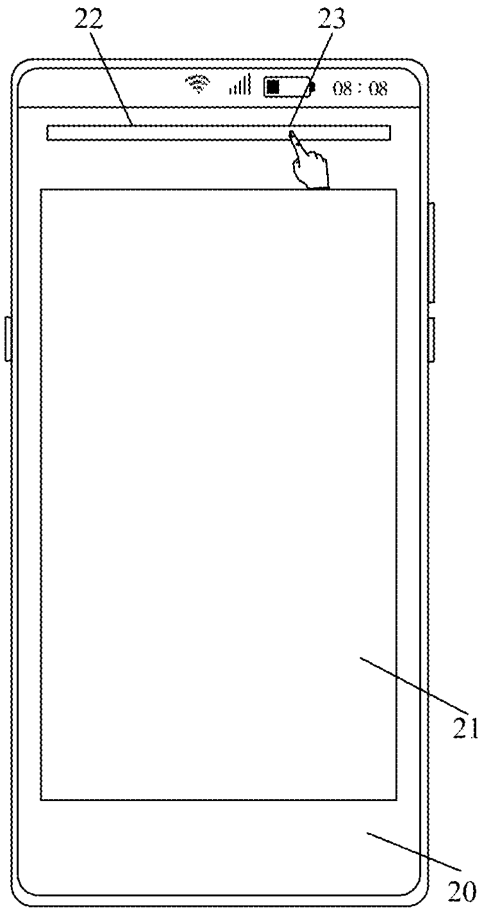
FIG. 2 is a schematic diagram of a screen applied to an image processing method according to an embodiment of this application.

For example, as shown in FIG. 2, the electronic device displays an image 21 (that is, the first image) and a color adjustment control 22 (that is, the target control) on an image browsing screen 20. If the electronic device receives a tap input (that is, the first input) on the color adjustment control 22 by the user, the electronic device may adjust a color parameter of the image 21 based on an end position 23 of the input on the color adjustment control 22, so that the image 21 can be adjusted to a color effect (that is, the target effect) corresponding to the input.

It should be noted that in this embodiment of this application, the user can trigger the electronic device on the shooting preview screen to adjust the first image to the target effect corresponding to the first input, and then trigger the electronic device on the shooting screen or the image browsing screen to continue to adjust the after-adjustment first image. That is, the electronic device can adjust the color or light shadow of the first image during pre-shooting and post-shooting, and the parameter adjusted during pre-shooting can continue to be adjusted during post-shooting.

According to the image processing method provided in this embodiment of this application, based on an input on a control for adjusting color or light shadow by the user, the electronic device can adjust a displayed image to an effect corresponding to the input. That is, when the electronic device performs processing on the image, the color or light shadow effect of the image can be adjusted through only one input by the user, thereby simplifying the image processing process.

Optionally, in this embodiment of this application, the target control is used for adjusting color. Before the electronic device adjusts the first image to the target effect corresponding to the first input, the image processing method provided in this embodiment of this application may further include the following step 104.

Step 104: The electronic device obtains a type of the first image.

Optionally, in this embodiment of this application, the first image may be an image including a face image (that is, a first type described below) or an image not including a face image (that is, a second type described below).

Optionally, in this embodiment of this application, the electronic device can obtain the type of the first image by comparing the first image with trained face models in the electronic device.

Optionally, in this embodiment of this application, the electronic device can adjust, based on the type of the first image, the first image to the target effect corresponding to the first input through one possible implementation or another possible implementation described below.

One Possible Implementation:

Optionally, in this embodiment of this application, the foregoing step 103 may be implemented by step **103*a*** described below.

Step **103*a***: In response to the first input, the electronic device adjusts, in a first manner, the first image to a first effect corresponding to the first input, in a case that the first image is of a first type.

It can be understood that the first effect is the foregoing target effect in a case that the first image is of the first type.

Optionally, in this embodiment of this application, the foregoing step **103*a* may be implemented by step 103*al* to step 103*a*3** described below.

Step **103*a*1**: In response to the first input, the electronic device determines a preset channel of the first image in a case that the first image is of the first type.

Optionally, in this embodiment of this application, the preset channel may be a color channel corresponding to the face image in the first image.

Step **103*a*2**: The electronic device adjusts a first color of the preset channel to a first target color value corresponding to the first input.

Optionally, in this embodiment of this application, the first color may be saturation, or saturation and brightness in the foregoing color parameter.

Optionally, in this embodiment of this application, the first target color value may be saturation, or saturation and brightness corresponding to the preset channel in saturation, or saturation and brightness corresponding to the end position of the first input to the target control.

Optionally, in this embodiment of this application, the preset channel may include a first channel, a second channel, and a third channel. In this case, the foregoing step **103*a*2** may be implemented by at least one of the following step A, step B, or step C.

Step A: The electronic device adjusts the first color of the first channel to a first sub-color value corresponding to the first channel in the first target color value.

Optionally, in this embodiment of this application, the first channel may be a red channel, and the electronic device may adjust saturation, or saturation and brightness of the red channel to saturation, or saturation and brightness corresponding to the red channel in the first target color value.

Step B: The electronic device adjusts the first color of the second channel to a second sub-color value corresponding to the second channel in the first target color value.

Optionally, in this embodiment of this application, the second channel may be an orange channel, and the electronic device may adjust saturation, or saturation and brightness of the orange channel to saturation, or saturation and brightness corresponding to the orange channel in the first target color value.

Step C: The electronic device adjusts the first color of the third channel to a third sub-color value corresponding to the third channel in the first target color value.

Optionally, in this embodiment of this application, the third channel may be a yellow channel, and the electronic device may adjust saturation, or saturation and brightness of the yellow channel to saturation, or saturation and brightness corresponding to the yellow channel in the first target color value.

Optionally, in this embodiment of this application, the target control may include a first sub-control and a second sub-control that are connected. For example, assuming that the target control is a bar control in an X-axis direction and the target control includes a position range of [−100,100], the first sub-control may be a sub-control with a position range of [−100,0] in the target control, and the second sub-control may be a sub-control with a position range of [0,100] in the target control.

Optionally, in this embodiment of this application, if the end position of the first input is on the first sub-control, the foregoing step **103*a*2 can be implemented through the foregoing step A, the first color is saturation; and the electronic device may also adjust saturation and brightness of other channels than the first channel, the second channel, and the third channel to saturation and brightness corresponding to the first input; or if the end position of the first input is on the second sub-control, the foregoing step 103*a*2** can be implemented through the foregoing steps A, B, and C, and the first color is saturation and brightness.

It should be noted that adjusting the color of the channel by the electronic device is actually adjusting the tint of the color corresponding to the channel by the electronic device.

In this embodiment of this application, the electronic device can adjust, based on the first input, the first color of at least one channel in the preset channel to the corresponding color value, thereby improving flexibility of image processing.

Step **103*a*3**: The electronic device adjusts a second color of the first image to a second target color value corresponding to the first input.

Optionally, in this embodiment of this application, the first effect may be indicated by the first target color value and the second target color value.

Optionally, in this embodiment of this application, the second color may be contrast and dark angle, or contrast and natural saturation.

Optionally, in this embodiment of this application, the second target color value may be contrast and dark angle, or contrast and natural saturation corresponding to an end position of the first input to the target control.

It can be understood that the electronic device adjusts the first color of the first image to the first target color value and the second color of the first image to the second target color value, so that the first image obtained through adjustment of the color parameter can be displayed with the first effect, that is, the first target color value and the second target color value can indicate the first effect.

In this embodiment of this application, because the electronic device can directly determine the preset channel of the first image in a case that the first image is of the first type (that is, including a face image), and adjust the first color of the preset channel and the second color of the first image to the color values corresponding to the first input, the processing effect of the face image in the first image can be ensured, improving atmosphere of the first image.

Another Possible Implementation:

Optionally, in this embodiment of this application, the foregoing step 103 may be implemented by step **103*b*** described below.

Step **103*b***: In response to the first input, the electronic device adjusts, in a second manner, the first image to a second effect corresponding to the first input, in a case that the first image is of a second type.

It can be understood that the second effect is the target effect in a case that the first image is of the second type.

Optionally, in this embodiment of this application, the electronic device can adjust, in the second manner, the first image to the second effect corresponding to the first input through the following way 1 and/or way 2.

Way 1:

Optionally, in this embodiment of this application, the foregoing step **103*b* may be implemented by step 103*b*1 to step 103*b*4** described below.

Step **103*b*1**: In response to the first input, the electronic device determines a main color channel, an auxiliary color channel, and a variegated color channel of the first image in a case that the first image is of the second type.

Optionally, in this embodiment of this application, the foregoing step **103*b*1** may be implemented by step D, step E, step F, and step G described below.

Step D: In response to the first input, the electronic device determines a main color and an auxiliary color of the first image in a case that the first image is of the second type.

Optionally, in this embodiment of this application, the foregoing step D may be implemented by step D1 to step D3 described below.

Step D1: In response to the first input, the electronic device determines a color with a largest sum of saturation and brightness in the colors of the first image as the main color in a case that the first image is of the second type.

Optionally, in this embodiment of this application, the electronic device can read the saturation and brightness of the colors in the first image, and sort sums of saturation and brightness of colors other than black, white, and gray colors (that is, saturation is less than 20 and brightness is greater than 20) in the first image, so as to determine the color with the largest sum of saturation and brightness as the main color of the first image.

Step D2: The electronic device determines at least one color region in the first image based on the main color and the color wheel.

In this embodiment of this application, the color wheel may be a visible long-strip color sequence connected end to end on a color spectrum, so that the red color is connected to the purple color at the other end, and the color wheel may include 12-24 different colors.

Optionally, in this embodiment of this application, the electronic device can divide the color wheel into a plurality of unit color channels on average, and the number of unit color channels divided by the electronic device may be a default value set by the system or may be set according to actual use requirements of the user.

Optionally, in this embodiment of this application, each color region may correspond to one color, and the included angle between a position of a color corresponding to each color region in the color wheel and a first position is greater than or equal to a preset angle.

In this embodiment of this application, the first position is a position of the main color in the color wheel.

Optionally, in this embodiment of this application, the electronic device can determine at least one angle range in the color wheel based on at least one preset angle, set a priority of the at least one angle range, and determine at least one color region in the first image based on the priority.

Step D3: The electronic device determines a color corresponding to a color region with a largest area in the at least one color region as the auxiliary color.

Optionally, in this embodiment of this application, the color region with the largest area may be a color region with the largest number of pixels.

It should be noted that, in this embodiment of this application, if there is no color region corresponding to the color whose included angle between the position in the color wheel and the first position is greater than or equal to the preset angle in the first image, the electronic device can determine that there is no auxiliary color in the first image.

The following describes the image processing method provided in this embodiment of this application by using examples with reference to the accompanying drawings.

Figure 3:
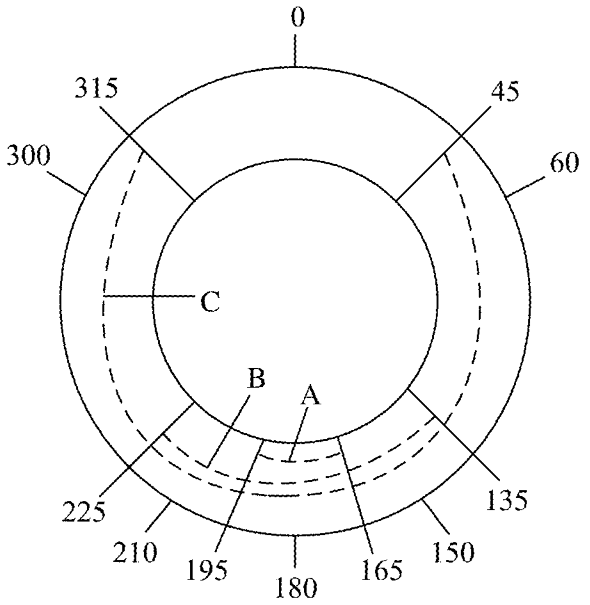
FIG. 3 is a schematic diagram of a method for determining an auxiliary color of a first image by an electronic device in an image processing method according to an embodiment of this application.

For example, as shown in FIG. 3, it is assumed that the first position is a position 0 in the color wheel, the electronic device determines an angle range A with an included angle equal to 180 degrees (a preset angle) relative to the position 0 and a 15-degree margin, determines an angle range B with an included angle greater than or equal to 150 degrees (a preset angle) relative to the position 0 and a 15-degree margin, and determines an angle range C with an included angle greater than or equal to 60 degrees (a preset angle) relative to the position 0 and a 15-degree margin; and a priority sequence is the angle range A, the angle range B, and the angle range C. Then, if a position of color 1' corresponding to a color region 1 in the first image in the color wheel is in the angle range A, the electronic device can determine the color 1' as the auxiliary color of the first image; if no color corresponding to the color region in the first image is in the angle range A, positions of color 2' corresponding to a color region 2 and color 3' corresponding to a color region 3 in the color wheel in the first image are in the angle range B, and an area of the color region 2 is larger than an area of the color region 3, the electronic device may determine the color 2' as the auxiliary color of the first image; or if no color corresponding to the color region in the first image is in the angle range A and the angle range B, positions of color 4' corresponding to a color region 4 and color 5' corresponding to a color region 5 in the color wheel in the first image are in the angle range C, and an area of the color region 5 is larger than an area of the color region 4, the electronic device can determine the color 5' as the auxiliary color of the first image.

In this embodiment of this application, because the electronic device can determine the color with the largest sum of saturation and brightness of colors in the first image as the main color of the first image, and can determine the auxiliary color of the first image based on the main color and the color wheel, the electronic device can accurately obtain the main color and the auxiliary color of the first image, thereby improving accuracy of image processing.

Step E: The electronic device determines all unit color channels corresponding to a first preset angle range in the color wheel as main color channels.

In this embodiment of this application, the center of the first preset angle range coincides with the first position of the main color in the color wheel.

Optionally, in this embodiment of this application, the first preset angle range may be a default value set by the system or may be set according to actual use requirements of the user.

Optionally, in this embodiment of this application, all the unit color channels corresponding to the first preset angle range may be all unit color channels having coincidence angles with the first preset angle range in the color wheel.

Step F: The electronic device determines all unit color channels corresponding to a second preset angle range in the color wheel as auxiliary color channels.

In this embodiment of this application, the center of the second preset angle range coincides with a second position of the auxiliary color in the color wheel.

Optionally, in this embodiment of this application, the second preset angle range may be a default value set by the system or may be set according to actual use requirements of the user.

Optionally, in this embodiment of this application, the second preset angle and the first preset angle may be the same or different.

Optionally, in this embodiment of this application, all the unit color channels corresponding to the second preset angle range may be all unit color channels having coincidence angles with the second preset angle range in the color wheel.

Step G: The electronic device determines an unit color channel other than the main color channel and the auxiliary color channel in the color wheel as the variegated color channel.

Optionally, in this embodiment of this application, if there is no auxiliary color in the first image, the variegated color channel is a unit color channel other than the main color channel in the color wheel.

In this embodiment of this application, the electronic device can determine the main color and the auxiliary color of the first image in a case that the first image is of the second type, so as to determine the main color channel, the auxiliary color channel, and the variegated color channel, improving accuracy of image processing.

It should be noted that the image processing method provided in this embodiment of this application can also be applied to other scenes. For example, in a color-absorbing scene, the electronic device can determine a main color and an auxiliary color of desktop wallpaper by using the image processing method provided in this embodiment of this application, and then color icons of applications on the desktop in a targeted manner, so as to make the display effect more harmonious.

Step **103*b*2**: The electronic device adjusts a third color of a target channel to a third target color value corresponding to the first input.

Optionally, in this embodiment of this application, the target channel may be a main color channel or a variegated color channel.

Optionally, in this embodiment of this application, the third color may be saturation and brightness in the foregoing color parameter.

Optionally, in this embodiment of this application, the third target color value may be saturation and brightness corresponding to the target channel in saturation and brightness corresponding to the end position of the first input to the target control, that is, different target channels may correspond to different saturation and brightness.

Step **103*b*3**: The electronic device adjusts a third color of the auxiliary color channel to a fourth target color value corresponding to the first input.

Optionally, in this embodiment of this application, the fourth target color value may be saturation and brightness corresponding to the auxiliary color channel in the saturation and brightness corresponding to the end position of the first input to the target control.

Optionally, in this embodiment of this application, the main color channel or the auxiliary color channel may include at least two unit color channels in the color wheel, and the electronic device may determine coincidence angles of the at least two unit color channels with the target angle range to obtain at least two coincidence angles in one-to-one correspondence to the at least two unit color channels. For the main color channel, the target angle range is a first preset angle range; and for the auxiliary color channel, the target angle range is a second preset angle range. In this way, when adjusting the third color of the main color channel or the auxiliary color channel, the electronic device can adjust, based on at least one adjustment ratio, third colors of the at least two unit color channels included therein. Each adjustment ratio may be a ratio of one coincidence angle to a largest angle in the at least two coincidence angles.

Optionally, in this embodiment of this application, when adjusting, based on the at least one adjustment ratio, the third colors of the at least two unit color channels included in the main color channel or the auxiliary color channel, the electronic device can adjust a third color of a unit color channel corresponding to a largest coincidence angle in the at least two unit color channels to a target color value corresponding to the first input, and adjust a third color of each of the other unit color channels in the at least two unit color channels based on a corresponding adjustment ratio. It can be understood that if the main color channel or the auxiliary color channel includes two unit color channels, and two coincidence angles corresponding to the two unit color channels are equal, the electronic device can adjust third colors of the two unit color channels to the target color value corresponding to the first input.

Optionally, in this embodiment of this application, if the main color channel and the auxiliary color channel include a same unit color channel, the electronic device can adjust a third color of the same unit color channel to a maximum value of the third target color value and the fourth target color value.

The following describes the image processing method provided in this embodiment of this application by using examples with reference to the accompanying drawings.

Figure 4:
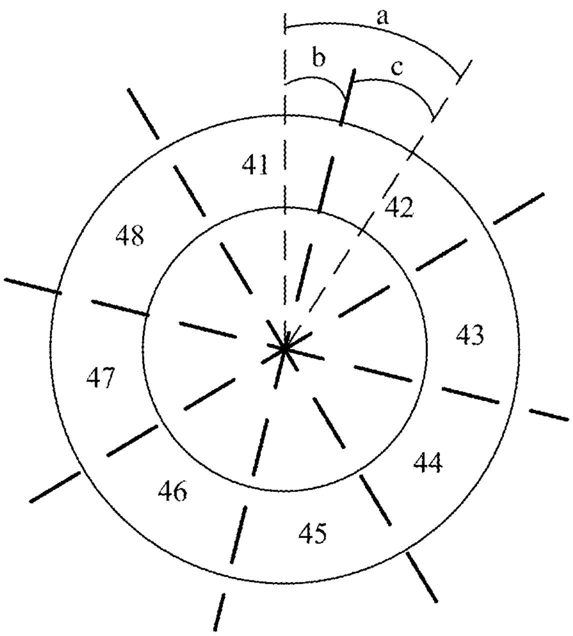
FIG. 4 is a schematic diagram of a method for determining at least one adjustment ratio by an electronic device in an image processing method according to an embodiment of this application.

For example, using adjustment of the third color of the main color channel by the electronic device as an example, as shown in FIG. 4, the electronic device can divide the color wheel into eight unit color channels (that is, a unit color channel 41 to a unit color channel 48) on average. Assuming that the main color channel includes a unit color channel 41 and a unit color channel 42 (that is, at least two unit color channels) and the first preset angle range is a, the electronic device may determine a coincidence angle b between the unit color channel 41 and a, and a coincidence angle c between the unit color channel 42 and a, where $b<c$. Therefore, the electronic device can adjust a third color of the unit color channel 42 to the third target color value, and adjust a third color of the unit color channel 41 based on an adjustment ratio of b/c. For example, the electronic device adjusts saturation of the unit color channel 42 to saturation A (that is, the third target color value), and adjusts saturation of the unit color channel 41 to $A\times(b/c)$ based on the adjustment ratio of b/c. In this way, the electronic device can adjust the third colors of the two unit color channels included in the main color channel in proportion, so as to improve accuracy of image processing and ensure that a processed image has a better display effect.

Step **103*b*4**: The electronic device adjusts a fourth color of the first image to a fifth target color value corresponding to the first input.

Optionally, in this embodiment of this application, the second effect may be indicated by the third target color value, the fourth target color value, and the fifth target color value.

Optionally, in this embodiment of this application, the fourth color can be contrast and dark angle, or contrast and natural saturation.

Optionally, in this embodiment of this application, the fifth target color value may be contrast and dark angle, or contrast and natural saturation corresponding to the end position of the first input to the target control.

It can be understood that the electronic device adjusts the third color of the first image to the fourth target color value and the fourth color of the first image to the fifth target color value; therefore, the first image obtained through adjustment of the color parameter can be displayed with the second effect, that is, the fourth target color value and the fifth target color value can indicate the second effect.

In this embodiment of this application, the electronic device can determine the main color channel, the auxiliary color channel, and the variegated color channel of the first image in a case that the first image is of the second type (that is, not including the face image), and adjust the third color of each channel and the fourth color of the first image to the color values corresponding to the first input, thereby improving accuracy of image processing and ensuring the display effect of the processed image.

Way 2:

Optionally, in this embodiment of this application, the forgoing step **103*b* may be implemented by step 103*b*5 and step 103*b*6** described below.

Step **103*b*5**: The electronic device determines a target color temperature adjustment amount corresponding to a target hue range in two color temperature adjustment amounts corresponding to the first input.

In this embodiment of this application, the target hue range is a hue range in which a hue of the main color of the first image is located.

Optionally, in this embodiment of this application, the target hue range may be a warm hue range or a cool hue range, the warm hue range may be [0,80] and [330,360], and the cool hue range may be (80,330).

Optionally, in this embodiment of this application, the first input may correspond to a first color temperature adjustment amount and a second color temperature adjustment amount, the first color temperature adjustment amount corresponds to a warm hue range, and the second color temperature adjustment amount corresponds to a cool hue range, so that the electronic device can determine the target color temperature adjustment amount based on the hue range in which the hue of the main color of the first image is located.

Step **103*b*6**: The electronic device adjusts a color temperature of the first image based on the target color temperature adjustment amount.

Optionally, in this embodiment of this application, the second effect may be indicated by an after-adjustment color temperature of the first image.

Optionally, in this embodiment of this application, if the hue range in which the hue of the main color of the first image is located is a warm hue range, the electronic device can determine the target color temperature adjustment amount as the first color temperature adjustment amount, and adjust the color temperature of the first image based on the first color temperature adjustment amount. For example, if an original color temperature of the first image is 50 and the first color temperature adjustment amount is increased by 20, the after-adjustment color temperature of the first image is 70. If the hue range in which the hue of the main color of the first image is located is a cool hue range, the electronic device can determine that the target color temperature adjustment amount is the second color temperature adjustment amount, and adjust the color temperature of the first image based on the second color temperature adjustment amount. For example, if the original color temperature of the first image is 50 and the second color temperature adjustment amount is decreased by 20, the after-adjustment color temperature of the first image is 30.

It can be understood that the electronic device can adjust the color temperature of the first image based on the target color temperature adjustment amount, so that the first image obtained through adjustment of the color temperature can be displayed with the second effect, that is, the after-adjustment color temperature of the first image can indicate the second effect.

In this embodiment of this application, the electronic device can adjust the color temperature of the first image based on the target color temperature adjustment amount corresponding to the target hue range in the two color temperature adjustment amounts corresponding to the first input, thereby ensuring accuracy of the color temperature of the processed image.

In this embodiment of this application, the electronic device can adjust, based on the obtained type of the first image, the first image to the effect corresponding to the first input in different manners, thereby improving flexibility of image processing.

In the image processing method provided in the embodiments of this application, the execution subject may be an image processing apparatus. In the embodiments of this application, the image processing method being performed by the image processing apparatus is used as an example to describe the image processing apparatus provided in the embodiments of this application.

Figure 5:
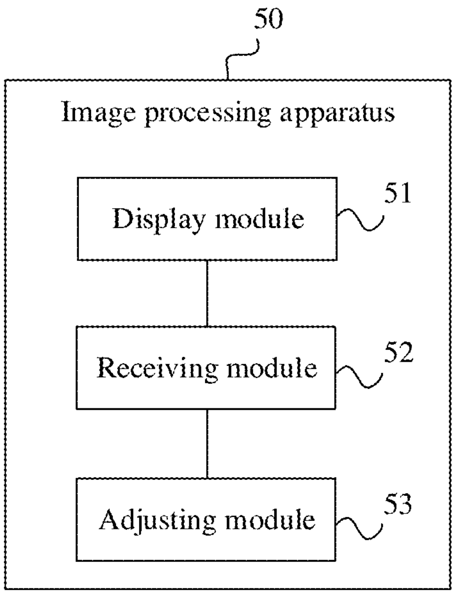
FIG. 5 is a schematic diagram of an image processing apparatus according to an embodiment of this application.

With reference to FIG. 5, an embodiment of this application provides an image processing apparatus 50. The image processing apparatus 50 may include a display module 51, a receiving module 52, and an adjusting module 53. The display module 51 may be configured to display a first image and a target control. The receiving module 52 may be configured to receive a first input to the target control by a user. The adjusting module 53 is configured to, in response to the first input received by the receiving module 52, adjust the first image to a target effect corresponding to the first input; where the target control is used for adjusting color or light shadow.

In a possible implementation, the target control may be used for adjusting color, and the image processing apparatus 50 may further include an obtaining module. The obtaining module may be further configured to: obtain a type of the first image before the adjusting module 53 adjusts the first image to the target effect corresponding to the first input. The adjusting module 53 may be configured to: in a case that the first image is of a first type, adjust, in a first manner, the first image to a first effect corresponding to the first input. The adjusting module 53 may be configured to: in a case that the first image of is a second type, adjust, in a second manner, the first image to a second effect corresponding to the first input.

In a possible implementation, the image processing apparatus 50 may further include a determining module. The determining module may be configured to: determine a preset channel of the first image. The adjusting module 53 may be configured to: adjust a first color of the preset channel to a first target color value corresponding to the first input. The adjusting module 53 may be configured to: adjust a second color of the first image to a second target color value corresponding to the first input. The first effect may be indicated by the first target color value and the second target color value.

In a possible implementation, the preset channel includes a first channel, a second channel, and a third channel. The adjusting module 53 may be configured to adjust at least one of the following: adjusting the first color of the first channel to a first sub-color value corresponding to the first channel in the first target color value; adjusting the first color of the second channel to a second sub-color value corresponding to the second channel in the first target color value; or adjusting the first color of the third channel to a third sub-color value corresponding to the third channel in the first target color value.

In a possible implementation, the determining module may be configured to: determine a main color channel, an auxiliary color channel, and a variegated color channel of the first image. The adjusting module 53 may be configured to: adjust a third color of a target channel to a third target color value corresponding to the first input, where the target channel is the main color channel or the variegated color channel. The adjusting module 53 may be configured to: adjust a third color of the auxiliary color channel to a fourth target color value corresponding to the first input. The adjusting module 53 may be configured to: adjust a fourth color of the first image to a fifth target color value corresponding to the first input. The second effect may be indicated by the third target color value, the fourth target color value, and the fifth target color value.

In a possible implementation, the determining module may be configured to: determine a target color temperature adjustment amount corresponding to a target hue range in two color temperature adjustment amounts corresponding to the first input, where the target hue range is a hue range in which a hue of a main color of the first image is located. The adjusting module 53 may be configured to: adjust a color temperature of the first image based on the target color temperature adjustment amount. The second effect is indicated by an after-adjustment color temperature of the first image.

In a possible implementation, the determining module may be configured to: determine a main color and an auxiliary color of the first image. The determining module may be configured to: determine all unit color channels corresponding to a first preset angle range in a color wheel as the main color channel, where a center of the first preset angle range coincides with a first position of the main color in the color wheel. The determining module may be configured to: determine all unit color channels corresponding to a second preset angle range in the color wheel as the auxiliary color channel, where a center of the second preset angle range coincides with a second position of the auxiliary color in the color wheel. The determining module may be configured to: determine an unit color channel other than the main color channel and the auxiliary color channel in the color wheel as the variegated color channel.

In a possible implementation, the determining module may be configured to: determine a color with a largest sum of saturation and brightness in colors of the first image as the main color. The determining module may be configured to: determine at least one color region in the first image based on the main color and the color wheel, where each color region corresponds to one color, and an included angle between a position of the color corresponding to each color region in the color wheel and the first position is greater than or equal to a preset angle. The determining module may be configured to: determine a color corresponding to a color region with a largest area in the at least one color region as the auxiliary color.

According to the image processing apparatus provided in this embodiment of this application, based on an input on a control for adjusting color or light shadow by the user, the image processing apparatus can adjust a displayed image to an effect corresponding to the input. That is, when the image processing apparatus performs processing on the image, the color or light shadow effect of the image can be adjusted through only one input by the user, thereby simplifying the image processing process.

For beneficial effects of implementations in this embodiment, reference may be made to the beneficial effects of the corresponding implementations in the foregoing method embodiments. To avoid repetition, details are not described herein again.

The image processing apparatus in this embodiment of this application may be an electronic device, or may be a component in the electronic device, such as an integrated circuit or a chip. The electronic device may be a terminal or other devices than the terminal. For example, the electronic device may be a mobile phone, a tablet computer, a notebook computer, a palmtop computer, an in-vehicle electronic device, a mobile Internet device (MID), an augmented reality (AR)/virtual reality (VR) device, a robot, a wearable device, an ultra-mobile personal computer (UMPC), a netbook, a personal digital assistant (PDA), or the like; or may be a server, a network-attached storage (NAS), a personal computer (PC), a television (TV), a teller machine, a self-service machine, or the like. This is not limited in the embodiments of this application.

The image processing apparatus in this embodiment of this application may be an apparatus with an operating system. The operating system may be an Android operating system, an iOS operating system, or other possible operating systems, and is not limited in the embodiments of this application.

The image processing apparatus provided in this embodiment of this application is capable of implementing the processes that are implemented by the method embodiments in FIG. 1 to FIG. 4. To avoid repetition, details are not described herein again.

Figure 6:
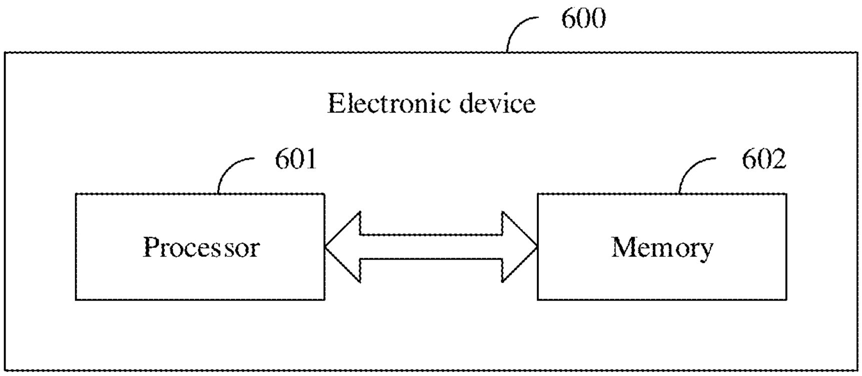
FIG. 6 is a schematic diagram of an electronic device according to an embodiment of this application.

Optionally, as shown in FIG. 6, an embodiment of this application further provides an electronic device 600, including a processor 601, a memory 602, and a program or instructions stored in the memory 602 and executable on the processor 601. When the program or the instructions are executed by the processor 601, the processes of the foregoing embodiments of the image processing method are implemented, with the same technical effects achieved. To avoid repetition, details are not described herein again.

It should be noted that the electronic device in this embodiment of this application includes the aforementioned mobile electronic device and non-mobile electronic device.

Figure 7:
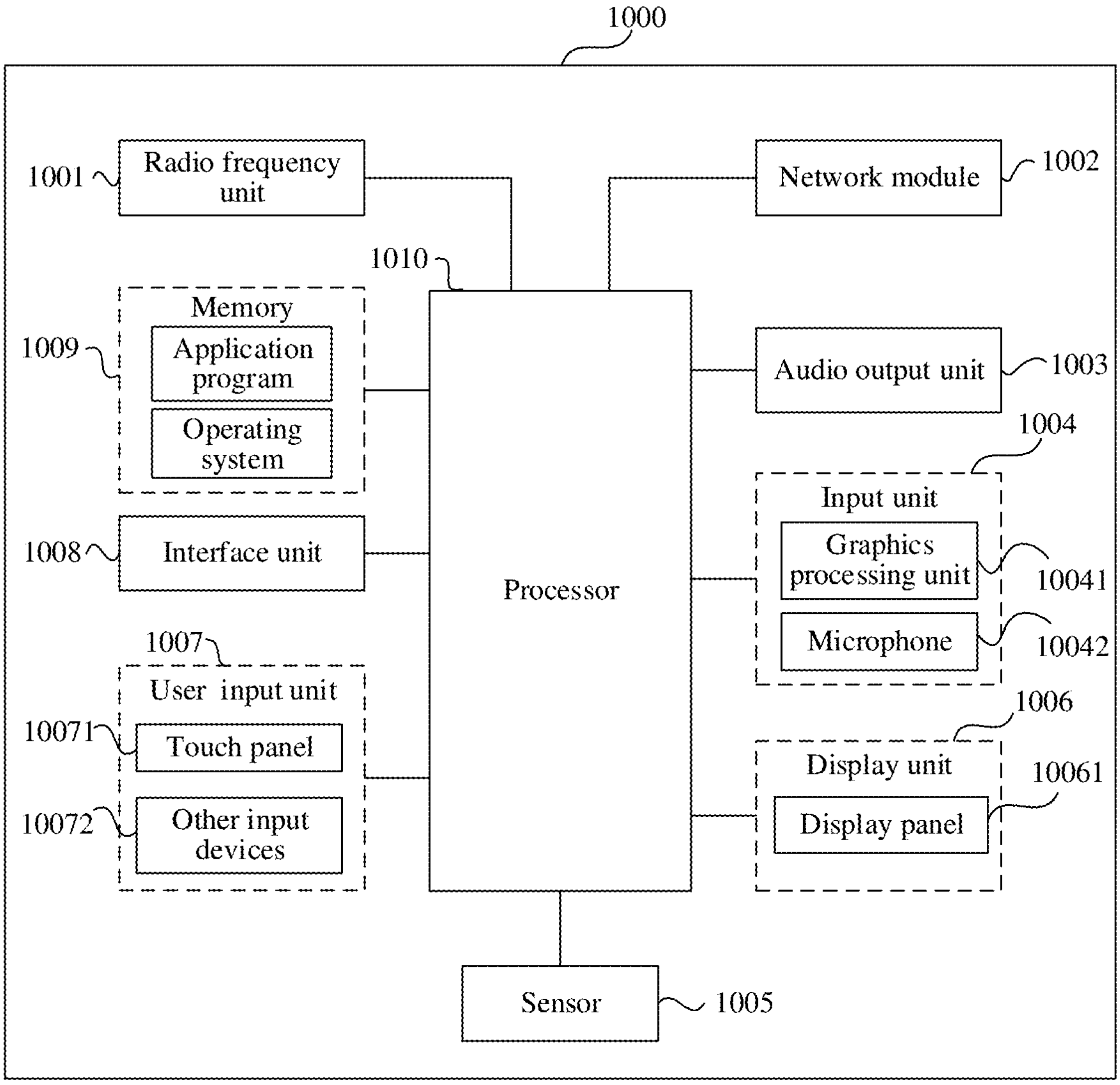
FIG. 7 is a schematic diagram of hardware of an electronic device according to an embodiment of this application.

FIG. 7 is a schematic diagram of a hardware structure of an electronic device according to an embodiment of this application.

The electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (for example, a battery) supplying power to all components, and the power supply may be logically connected to the processor 1010 through a power management system. In this way, functions such as charge management, discharge management, and power consumption management are implemented by using the power management system. The structure of the electronic device shown in FIG. 7 does not constitute any limitation on the electronic device. The electronic device may include more or fewer components than shown in the figure, or a combination of some components, or the components disposed differently. Details are not repeated herein.

The display unit 1006 may be configured to display a first image and a target control. The user input unit 1007 may be configured to receive a first input to the target control by a user. The processor 1010 may be configured to: in response to the first input received by the user input unit 1007, adjust the first image to a target effect corresponding to the first input; where the target control is used for adjusting color or light shadow.

In a possible implementation, the target control may be used for adjusting color. The processor 1010 may be further configured to: obtain a type of the first image before adjusting the first image to the target effect corresponding to the first input. The processor 1010 may be further configured to: in a case that the first image is of a first type, adjust, in a first manner, the first image to a first effect corresponding to the first input. The processor 1010 may be further configured to: in a case that the first image is of a second type, adjust, in a second manner, the first image to a second effect corresponding to the first input.

In a possible implementation, the processor 1010 may be further configured to: determine a preset channel of the first image. The processor 1010 may be configured to: adjust a first color of the preset channel to a first target color value corresponding to the first input. The processor 1010 may be configured to: adjust a second color of the first image to a second target color value corresponding to the first input. The first effect may be indicated by the first target color value and the second target color value.

In a possible implementation, the preset channel includes a first channel, a second channel, and a third channel. The processor 1010 may be configured to adjust at least one of the following: adjusting the first color of the first channel to a first sub-color value corresponding to the first channel in the first target color value; adjusting the first color of the second channel to a second sub-color value corresponding to the second channel in the first target color value; or adjusting the first color of the third channel to a third sub-color value corresponding to the third channel in the first target color value.

In a possible implementation, the processor 1010 may be configured to: determine a main color channel, an auxiliary color channel, and a variegated color channel of the first image. The processor 1010 may be configured to: adjust a third color of a target channel to a third target color value corresponding to the first input, where the target channel is the main color channel or the variegated color channel. The processor 1010 may be configured to: adjust a third color of the auxiliary color channel to a fourth target color value corresponding to the first input. The processor 1010 may be configured to: adjust a fourth color of the first image to a fifth target color value corresponding to the first input. The second effect may be indicated by the third target color value, the fourth target color value, and the fifth target color value.

In a possible implementation, the processor 1010 may be configured to: determine a target color temperature adjustment amount corresponding to a target hue range in two color temperature adjustment amounts corresponding to the first input, where the target hue range is a hue range in which a hue of a main color of the first image is located. The processor 1010 may be configured to: adjust a color temperature of the first image based on the target color temperature adjustment amount. The second effect is indicated by an after-adjustment color temperature of the first image.

In a possible implementation, the processor 1010 may be configured to: determine a main color and an auxiliary color of the first image. The processor 1010 may be configured to: determine all unit color channels corresponding to a first preset angle range in a color wheel as the main color channel, where a center of the first preset angle range coincides with a first position of the main color in the color wheel. The processor 1010 may be configured to: determine all unit color channels corresponding to a second preset angle range in the color wheel as the auxiliary color channel, where a center of the second preset angle range coincides with a second position of the auxiliary color in the color wheel. The processor 1010 may be configured to: determine an unit color channel other than the main color channel and the auxiliary color channel in the color wheel as the variegated color channel.

In a possible implementation, the processor 1010 may be configured to: determine a color with a largest sum of saturation and brightness in colors of the first image as the main color. The processor 1010 may be configured to: determine at least one color region in the first image based on the main color and the color wheel, where each color region corresponds to one color, and an included angle between a position of the color corresponding to each color region in the color wheel and the first position is greater than or equal to a preset angle. The processor 1010 may be configured to: determine a color corresponding to a color region with a largest area in the at least one color region as the auxiliary color.

According to the electronic device provided in this embodiment of this application, based on an input on a control for adjusting color or light shadow by the user, the electronic device can adjust a displayed image to an effect corresponding to an input. That is, when the electronic device performs processing on the image, the color or light shadow effect of the image can be adjusted through only one input by the user, thereby simplifying the image processing process.

For beneficial effects of implementations in this embodiment, reference may be made to the beneficial effects of the corresponding implementations in the foregoing method embodiments. To avoid repetition, details are not described herein again.

It can be understood that in this embodiment of this application, the input unit 1004 may include a graphics processing unit (GPU) 10041 and a microphone 10042. The graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, and the like. The user input unit 1007 may include at least one of a touch panel 10071 or other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or a power on/off key), a trackball, a mouse, a joystick, and the like. Details are not described herein.

The memory 1009 may be configured to store software programs and various data. The memory 1009 may include a first storage area for storing a program or instructions and a second storage area for storing data. The first storage area may store an operating system, an application program or instruction required by at least one function (for example, a sound playback function or an image playback function), and the like. In addition, the memory 1009 may include a volatile memory or a non-volatile memory, or the memory 1009 may include both a volatile memory and a non-volatile memory. The non-volatile memory may be a read-only memory (ROM), a programmable read only memory (PROM), an erasable programmable read-only memory (EPROM), and an electrically erasable programmable read-only memory (EEPROM), or flash memory. The volatile memory can be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 1009 in the embodiments of this application includes but is not limited to these and any other suitable types of memories.

The processor 1010 may include one or more processing units. Optionally, an application processor and a modem processor may be integrated in the processor 1010. The application processor primarily processes operations involving an operating system, user interfaces, application programs, and the like. The modem processor primarily processes radio communication signals, for example, being a baseband processor. It can be understood that the modem processor may alternatively be not integrated in the processor 1010.

An embodiment of this application further provides a non-transitory readable storage medium, where a program or an instruction is stored in the non-transitory readable storage medium. When the program or the instruction is executed by a processor, the processes of the foregoing embodiment of the image processing method can be implemented, with the same technical effects achieved. To avoid repetition, details are not described herein again.

The processor is a processor in the electronic device described in the foregoing embodiments. The non-transitory readable storage medium includes a non-transitory computer-readable storage medium, for example, a computer read only memory ROM, a random access memory RAM, a magnetic disk, or an optical disc.

An embodiment of this application further provides a chip, where the chip includes a processor and a communication interface. The communication interface is coupled to the processor, and the processor is configured to run a program or an instruction to implement the processes of the foregoing embodiment of the image processing method, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application provides a computer program product, where the program product is stored in a non-transitory storage medium, and the program product is executed by at least one processor to implement the processes of the foregoing image processing method embodiments, with the same technical effects achieved. To avoid repetition, details are not repeated herein.

It should be noted that in this specification, the term "include", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. It should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing implementations. These implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. An image processing method, wherein the method comprises:

displaying a first image and a target control;

receiving a first input to the target control by a user; and in response to the first input, adjusting the first image to a target effect corresponding to the first input; wherein the target control is used for adjusting color;

wherein before the adjusting the first image to the target effect corresponding to the first input, the method further comprises:

obtaining a type of the first image; and the adjusting the first image to the target effect corresponding to the first input comprises:

in a case that the first image is of a first type, adjusting, in a first manner, the first image to a first effect corresponding to the first input; and in a case that the first image is of a second type, adjusting, in a second manner, the first image to a second effect corresponding to the first input;

wherein the adjusting, in the first manner, the first image to the first effect corresponding to the first input comprises:

determining a preset channel of the first image;

adjusting a first color of the preset channel to a first target color value corresponding to the first input; and adjusting a second color of the first image to a second target color value corresponding to the first input; wherein the first effect is indicated by the first target color value and the second target color value;

wherein the preset channel comprises a first channel, a second channel, and a third channel; and the adjusting the first color of the preset channel to the first target color value corresponding to the first input comprises at least one of the following:

adjusting a first color of the first channel to a first sub-color value corresponding to the first channel in the first target color value;

adjusting a first color of the second channel to a second sub-color value corresponding to the second channel in the first target color value; or adjusting a first color of the third channel to a third sub-color value corresponding to the third channel in the first target color value;

wherein the adjusting, in the second manner, the first image to the second effect corresponding to the first input comprises:

determining a main color channel, an auxiliary color channel, and a variegated color channel of the first image;

adjusting a third color of a target channel to a third target color value corresponding to the first input, wherein the target channel is the main color channel or the variegated color channel;

adjusting a third color of the auxiliary color channel to a fourth target color value corresponding to the first input; and adjusting a fourth color of the first image to a fifth target color value corresponding to the first input; wherein the second effect is indicated by the third target color value, the fourth target color value, and the fifth target color value;

wherein the determining the main color channel, the auxiliary color channel, and the variegated color channel of the first image comprises:

determining a main color and an auxiliary color of the first image;

determining all unit color channels corresponding to a first preset angle range in a color wheel as the main color channel, wherein a center of the first preset angle range coincides with a first position of the main color in the color wheel;

determining all unit color channels corresponding to a second preset angle range in the color wheel as the auxiliary color channel, wherein a center of the second preset angle range coincides with a second position of the auxiliary color in the color wheel; and determining an unit color channel other than the main color channel and the auxiliary color channel in the color wheel as the variegated color channel.

2. The method according to claim 1, wherein the adjusting, in the second manner, the first image to the second effect corresponding to the first input comprises:

determining a target color temperature adjustment amount corresponding to a target hue range in two color temperature adjustment amounts corresponding to the first input, wherein the target hue range is a hue range in which a hue of a main color of the first image is located; and adjusting a color temperature of the first image based on the target color temperature adjustment amount; wherein the second effect is indicated by an after-adjustment color temperature of the first image.

3. The method according to claim 1, wherein the determining the main color and the auxiliary color of the first image comprises:

determining a color with a largest sum of saturation and brightness in colors of the first image as the main color;

determining at least one color region in the first image based on the main color and the color wheel, wherein each color region corresponds to one color, and an included angle between a position of a color corresponding to each color region in the color wheel and the first position is greater than or equal to a preset angle; and determining a color corresponding to a color region with a largest area in the at least one color region as the auxiliary color.

4. An electronic device, comprising a processor, a memory, and a program or instructions stored in the memory and executable on the processor, wherein the program or the instructions, when executed by the processor, cause the electronic device to perform:

displaying a first image and a target control;

receiving a first input to the target control by a user; and in response to the first input, adjusting the first image to a target effect corresponding to the first input; wherein the target control is used for adjusting color;

wherein the program or the instructions, when executed by the processor, cause the electronic device to further perform:

obtaining a type of the first image; and the program or the instructions, when executed by the processor, cause the electronic device to perform:

in a case that the first image is of a first type, adjusting, in a first manner, the first image to a first effect corresponding to the first input; and in a case that the first image is of a second type, adjusting, in a second manner, the first image to a second effect corresponding to the first input;

wherein the program or the instructions, when executed by the processor, cause the electronic device to perform:

determining a preset channel of the first image;

adjusting a first color of the preset channel to a first target color value corresponding to the first input; and adjusting a second color of the first image to a second target color value corresponding to the first input; wherein the first effect is indicated by the first target color value and the second target color value;

wherein the preset channel comprises a first channel, a second channel, and a third channel; and the program or the instructions, when executed by the processor, cause the electronic device to perform at least one of the following:

adjusting a first color of the first channel to a first sub-color value corresponding to the first channel in the first target color value;

adjusting a first color of the second channel to a second sub-color value corresponding to the second channel in the first target color value; or adjusting a first color of the third channel to a third sub-color value corresponding to the third channel in the first target color value;

wherein the program or the instructions, when executed by the processor, cause the electronic device to perform:

determining a main color channel, an auxiliary color channel, and a variegated color channel of the first image;

adjusting a third color of a target channel to a third target color value corresponding to the first input, wherein the target channel is the main color channel or the variegated color channel;

adjusting a third color of the auxiliary color channel to a fourth target color value corresponding to the first input; and adjusting a fourth color of the first image to a fifth target color value corresponding to the first input; wherein the second effect is indicated by the third target color value, the fourth target color value, and the fifth target color value;

wherein the program or the instructions, when executed by the processor, cause the electronic device to perform:

determining a main color and an auxiliary color of the first image;

determining all unit color channels corresponding to a first preset angle range in a color wheel as the main color channel, wherein a center of the first preset angle range coincides with a first position of the main color in the color wheel;

determining all unit color channels corresponding to a second preset angle range in the color wheel as the auxiliary color channel, wherein a center of the second preset angle range coincides with a second position of the auxiliary color in the color wheel; and determining an unit color channel other than the main color channel and the auxiliary color channel in the color wheel as the variegated color channel.

5. The electronic device according to claim 4, wherein the program or the instructions, when executed by the processor, cause the electronic device to perform:

determining a target color temperature adjustment amount corresponding to a target hue range in two color temperature adjustment amounts corresponding to the first input, wherein the target hue range is a hue range in which a hue of a main color of the first image is located; and adjusting a color temperature of the first image based on the target color temperature adjustment amount; wherein the second effect is indicated by an after-adjustment color temperature of the first image.

6. The electronic device according to claim 4, wherein the program or the instructions, when executed by the processor, cause the electronic device to perform:

determining a color with a largest sum of saturation and brightness in colors of the first image as the main color;

determining at least one color region in the first image based on the main color and the color wheel, wherein each color region corresponds to one color, and an included angle between a position of a color corresponding to each color region in the color wheel and the first position is greater than or equal to a preset angle; and determining a color corresponding to a color region with a largest area in the at least one color region as the auxiliary color.

7. A non-transitory readable storage medium, wherein the non-transitory readable storage medium stores a program or instructions, and the program or the instructions, when executed by a processor of an electronic device, cause the electronic device to perform:

displaying a first image and a target control;

receiving a first input to the target control by a user; and in response to the first input, adjusting the first image to a target effect corresponding to the first input; wherein the target control is used for adjusting color;

wherein the program or the instructions, when executed by the processor, cause the electronic device to further perform:

obtaining a type of the first image; and the program or the instructions, when executed by the processor, cause the electronic device to perform:

in a case that the first image is of a first type, adjusting, in a first manner, the first image to a first effect corresponding to the first input; and in a case that the first image is of a second type, adjusting, in a second manner, the first image to a second effect corresponding to the first input;

wherein the program or the instructions, when executed by the processor, cause the electronic device to perform:

determining a preset channel of the first image;

adjusting a first color of the preset channel to a first target color value corresponding to the first input; and adjusting a second color of the first image to a second target color value corresponding to the first input; wherein the first effect is indicated by the first target color value and the second target color value;

wherein the preset channel comprises a first channel, a second channel, and a third channel; and the program or the instructions, when executed by the processor, cause the electronic device to perform at least one of the following:

adjusting a first color of the first channel to a first sub-color value corresponding to the first channel in the first target color value;

adjusting a first color of the second channel to a second sub-color value corresponding to the second channel in the first target color value; or adjusting a first color of the third channel to a third sub-color value corresponding to the third channel in the first target color value;

wherein the program or the instructions, when executed by the processor, cause the electronic device to perform:

determining a main color channel, an auxiliary color channel, and a variegated color channel of the first image;

adjusting a third color of a target channel to a third target color value corresponding to the first input, wherein the target channel is the main color channel or the variegated color channel;

adjusting a third color of the auxiliary color channel to a fourth target color value corresponding to the first input; and adjusting a fourth color of the first image to a fifth target color value corresponding to the first input; wherein the second effect is indicated by the third target color value, the fourth target color value, and the fifth target color value;

wherein the program or the instructions, when executed by the processor, cause the electronic device to perform:

determining a main color and an auxiliary color of the first image;

determining all unit color channels corresponding to a first preset angle range in a color wheel as the main color channel, wherein a center of the first preset angle range coincides with a first position of the main color in the color wheel;

determining all unit color channels corresponding to a second preset angle range in the color wheel as the auxiliary color channel, wherein a center of the second preset angle range coincides with a second position of the auxiliary color in the color wheel; and determining an unit color channel other than the main color channel and the auxiliary color channel in the color wheel as the variegated color channel.

8. The non-transitory readable storage medium according to claim 7, wherein the program or the instructions, when executed by the processor, cause the electronic device to perform:

determining a target color temperature adjustment amount corresponding to a target hue range in two color temperature adjustment amounts corresponding to the first input, wherein the target hue range is a hue range in which a hue of a main color of the first image is located; and adjusting a color temperature of the first image based on the target color temperature adjustment amount; wherein the second effect is indicated by an after-adjustment color temperature of the first image.

9. The non-transitory readable storage medium according to claim 7, wherein the program or the instructions, when executed by the processor, cause the electronic device to perform:

determining a color with a largest sum of saturation and brightness in colors of the first image as the main color;

determining at least one color region in the first image based on the main color and the color wheel, wherein each color region corresponds to one color, and an included angle between a position of a color corresponding to each color region in the color wheel and the first position is greater than or equal to a preset angle; and determining a color corresponding to a color region with a largest area in the at least one color region as the auxiliary color.

* * * * *